May 26, 1953

N. J. RANDAZZO 2,639,915

FILM REEL DEVICE

Filed May 25, 1950

INVENTOR
NORMAN J. RANDAZZO

BY [signature]

ATTORNEY

May 26, 1953

N. J. RANDAZZO 2,639,915

FILM REEL DEVICE

Filed May 25, 1950

INVENTOR
NORMAN J. RANDAZZO
BY
ATTORNEY

Patented May 26, 1953

2,639,915

UNITED STATES PATENT OFFICE 2,639,915

FILM REEL DEVICE

Norman J. Randazzo, Brooklyn, N. Y.

Application May 25, 1950, Serial No. 164,052

4 Claims. (Cl. 271—2.19)

This invention relates to motion picture projector apparatus, more particularly to a unitary unwinding and winding rotary driven film reel.

In operating conventional projection apparatus, it is necessary to employ two film reels, one that unwinds for feeding the film through the projector optical system, and another take-up reel for receiving the film after it had passed through the projector. With such an arrangement it is obviously necessary, as is well known to all users of projection apparatus, to perform a rewinding operation—that is, to reattach the film to the original feeding reel and perform a rewinding operation from the take-up film. The disadvantages, both in manipulative effort, loss of time, excess space required by the take-up reel, and the resultant complexity of the projection apparatus, have long been recognized, and many attempts have been made to solve the problem by providing a unitary unwinding and winding reel. Such attempts have generally resulted in relatively intricate structures, at times not positive in operation, and generally commercially undesirable; and it is for this reason that practically all the motion picture projectors still find it necessary to employ separate feeding and take-up reels.

It is primarily within the contemplation of my invention to provide a unitary rotary driven reel which will avoid the need and difficulties of rewinding films between successive exhibits, and which will also avoid the shortcomings of other devices designed to accomplish the same objective.

It is also an important object of my invention to provide a reel capable of performing the functions aforesaid, and which will at the same time constitute a convenient self-contained film holder.

Still another object of my invention is to enable it to be operatively used with a projection machine of substantially conventional construction, but without a rewind mechanism, and which will be capable of ready attachment and detachment from the machine.

It is further within my contemplation to provide means for enabling the film to enter and leave the reel endwise, and yet to be held in place against endwise displacement. And in this aspect of my invention it is a further object, in a preferred form thereof, to provide a film retaining device which will maintain the film against displacement, and yet which will offer a minimum of resistance to the operative rotation of the reel.

And it is further within my contemplation to provide a relatively simple and easily fabricated reel, with no rollers or moving parts therein, capable of performing the functions hereinabove mentioned.

Other objects, features and advantages will appear from the drawings and the description hereinafter given.

Referring to the drawings.

Figure 1:
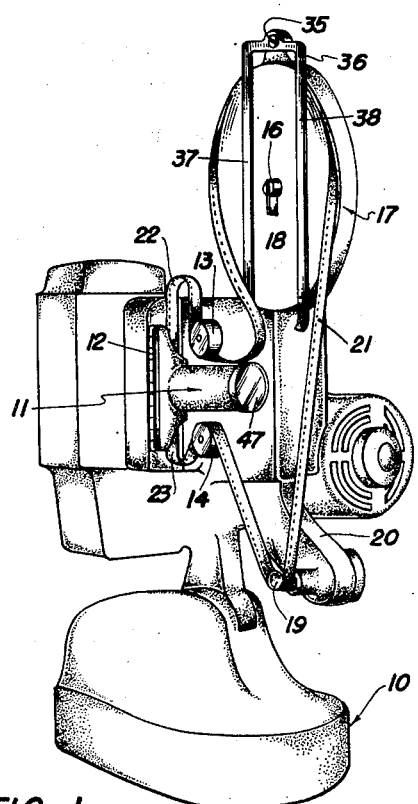
Figure 1 is a perspective view of a projection machine showing a preferred form of my invention operatively in place, with the film in position for projection.

In the form of my invention illustrated in Figures 1 to 5 the projector 10 is of generally conventional construction, having an optical system at 11 and a gate at 12 through which the film is adapted to pass, the machine containing rollers 13 and 14 for receiving and guiding the moving film and permitting the formation of conventional loops therein.

The machine is further provided with the reel carrying bracket 15 which operatively supports therein the shaft 16 driven by motor means not shown, such shaft operatively supporting the film reel 17 of my invention—the pivotal locking element 18 attached to shaft 16 being adapted, in obvious manner, to hold the reel 17 against detachment during the operative rotation thereof.

Figure 2:
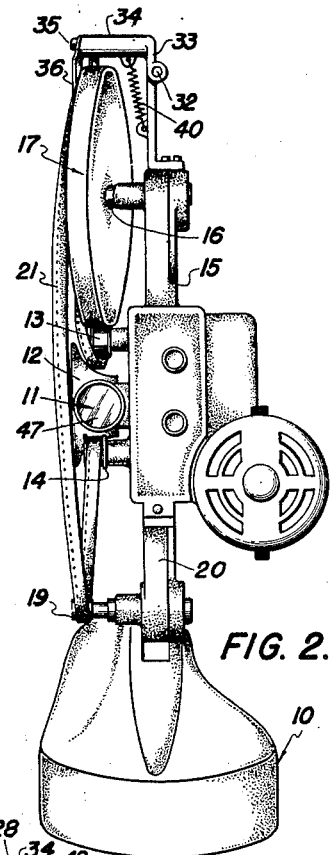
Figure 2 is a front view of Figure 1.

The machine also contains a return idler 19 attached to the bottom bracket 20 of the machine (Figures 1 and 2). The arrangement is hence such that the film 21 extends from the reel 17 to engage roller 13 and form the loop 22, pass through the gate 12 across the optical system at 11, engage the roller 14 to form the loop 23, engage the idler 19 and then return to the reel 17. The operative feeding of the film to the machine from the reel 17, and the rewinding of the film within the reel 17 will clearly appear from the description that will now be given.

Figure 3:
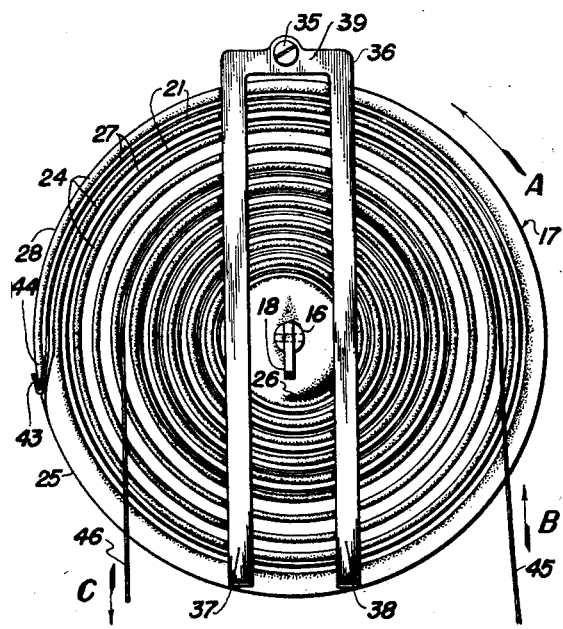
Figure 3 is a side view of the open side of the film reel of my invention, showing the film retainer operatively in place, and illustrating the film as it is being coincidentally unwound and wound.
Figure 4:
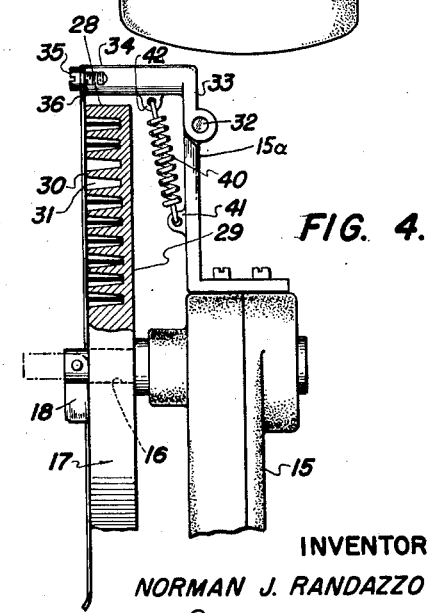
Figure 4 is a side view of Figure 3, showing a fragment of the projector framework.
Figure 5:
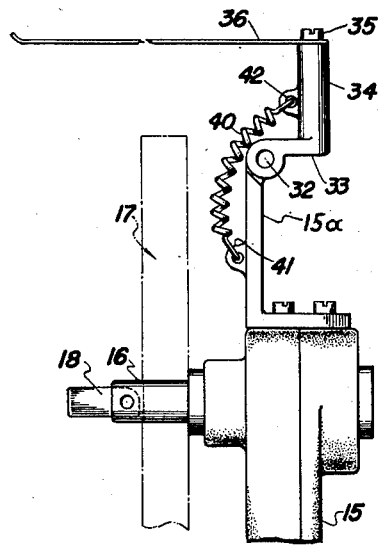
Figure 5 is a fragmentary view substantially like Figure 4, but showing the film retainer in operatively retracted position, to permit the attachment or detachment of the film reel.

In the preferred form of reel shown, particularly in Figures 3 and 4, the internal portion thereof is provided with a spiral wall 24 which extends inwardly from the outer periphery 25 to the innermost terminal thereof 26. The convolutions of said spiral wall accordingly form a spiral passage 27 extending from the outer periphery of the reel inwardly to said terminal 26. It is within the said passageway that the film 21 is disposed, as will more clearly hereinafter appear. The said reel 17 contains a peripheral end wall 28 and a side wall 29—the side 30 opposite wall 29 being open so as to provide corresponding openings 31 in spiral passageway 27, thereby permitting the film 21 within the passageway to enter and leave endwise, as clearly shown in Figures 1 and 2.

Pivotally mounted at 32 (Figures 4 and 5) on upright 15a of frame 15 is the bracket 33 which contains a forwardly extending arm 34 to the forward end of which is attached, by fastener 35, the film retainer 36 comprising, in the preferred form illustrated, the parallel strips 37 and 38 joined by the cross strip 39. The said strips 37 and 38 are preferably of light spring material, and are spaced so as to straddle the shaft 16, and extend across the entire diameter of the reel. The spring 40 anchored at 41 and attached to bracket 33 at 42 and positioned intermediate the pivotal mounting 32 and the said strips 37 and 38, exerts a slight downward and forward pressure upon the said bracket, so that the strips 37 and 38 are yieldably maintained, with relatively light pressure, against the open side 30 of the reel 17, when the retaining member is in the position of Figure 4. The yieldability of spring 40 nevertheless permits a retraction of bracket 33 to the position shown in Figure 5, whereupon the reel 17 may be removed and a new one substituted.

Prior to its operative use on a projector, the reel 17 serves as a self-contained film holder, containing the entire strip of film therein, the outer terminal portion 43 being shown hooked over the terminal portion 44 of the peripheral wall 28. In this position the entire film 21 is contained within the spiral groove 27. Thereafter (as will more clearly hereinafter appear from the description with respect to Figures 6 and 8) the said terminal portion 43 of the film is manually grasped, and the film partly unwound and threaded through the projector, around idler 19 (Figures 1 and 2) and back again into the outermost passageway and again into attachment with terminal portion 44. As the reel 17 turns counterclockwise (Figure 3) in the direction of arrow A, the return portion 45 of the film will be pulled upwardly in the direction of arrow B, thereby exerting a pull on the film therebelow and therebehind, which produces a pull on portion 46 of the film leaving the reel, in the direction of arrow C. As this operation continues, the unwinding of the film enables continuous projection to be effected, unwinding portions 46 moving inwardly towards the center, and rewinding portions 45 similarly moving inwardly towards the center. The unwinding and rewinding operations thus occur simultaneously. The relative positions of the idler 19 and the mounting on shaft 16 for the reel 17, and the slight angular relation between the axes of shaft 16 and idler 19, in the preferred form of my invention, enable the film to clear the projection lens 47, as clearly shown in Figure 2. Furthermore, since the film enters the reel endwise, it is relatively simple to proportion the members of this device to facilitate such clearance.

It is one of the features of the present invention that the film 21 enters and leaves the reel endwise, through the open spiral passageway 27. Any possible tendency of the film to shift out of the spiral passageway is resisted by the yieldable action of retainer of strips 37 and 38 which slidably bear against the ends of the spiral wall 24. The position of spring 40 and the light spring temper of strips 37 and 38, in the preferred embodiment of my invention, enable strips 37 and 38 to perform their retaining function without interfering with the operative rotation of reel 17.

Figure 6:
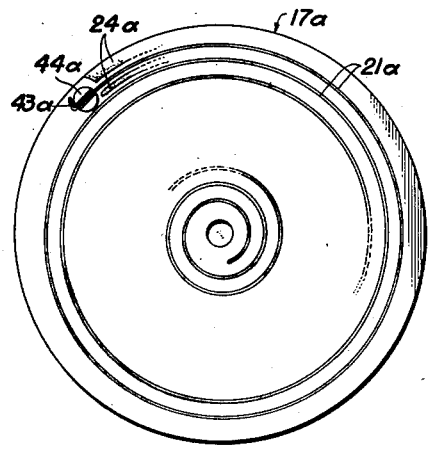
Figure 6 is a semi-schematic side view of a slightly modified form of reel according to my invention, showing the film entirely enclosed within the reel, prior to the unwinding thereof for projection purposes.
Figure 8:
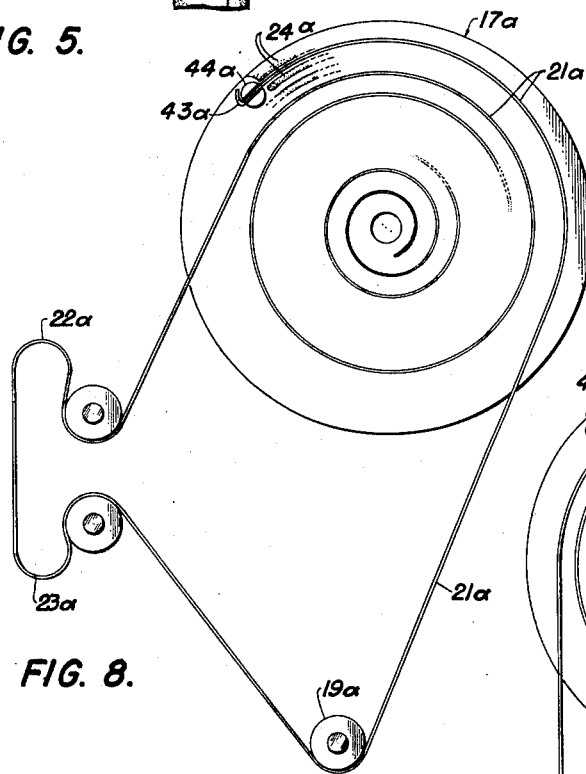
Figure 8 is another semi-schematic view, showing the reel of Figures 6 and 7 in relation to a rewind idler, and showing the position of the film extending through the projector and in position for rewinding.
Figure 7:
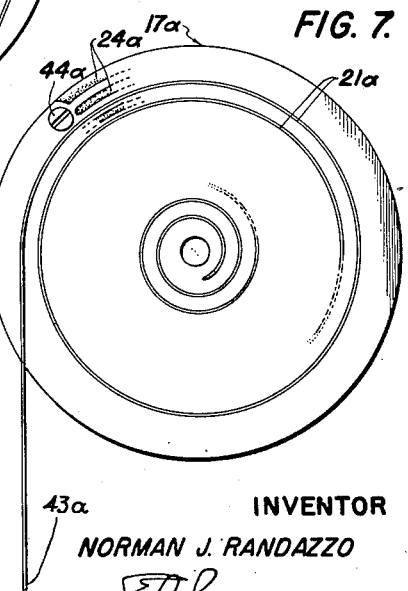
Figure 7 is a view like Figure 6, but showing the initial stage of unwinding the film, prior to passing it through the projector optical system.

To more clearly enable the operation of my invention to be visualized, slightly modified forms of my invention are illustrated in Figures 6, 7 and 8. The reel 17a contains therein the spiral coil of film 21a, the outermost terminal 43a of which is frictionally retained within the slotted holding portion 44a—the film being retained between the walls 24a.

Figure 6 shows the reel and the film contained therein before a projection operation. In Figure 7 the film is shown partly unwound, substantially like that of Figure 3, the terminal 43a having been removed from the slotted holding portion 44a. The film is then threaded through the projector, substantially as indicated in Figure 8, 22a and 23a being the loops, and the portion therebetween passing through the optical system of a projector not shown. The film 21a underlies the idler 19a and extends upwardly therefrom and into engagement with the slotted holding portion 24a.

The reel 17a moves, as aforesaid, in a counterclockwise direction, and the winding and unwinding of the film is simultaneously effectuated.

It will be observed that there are no rollers or moving parts on the reel. It consists merely of a spiral wall extending, in its preferred form, from the outer periphery inwardly towards the center of the reel, thereby in this form providing a spiral path within which the film is disposed. This is to be distinguished from all other devices of this general category, which contain relatively complex mechanisms. It is to be further noted that both the winding and unwinding portions of the film move inwardly towards the center during the operative rotation of the reel. And it is to be further observed that a projector of substantially conventional construction may be employed, except that the relatively complex take-up mechanism is eliminated.

The entire reel unit may be fabricated by known molding processes, with very thin walls to provide a large film capacity. The thickness and width of the spiral wall can obviously be made to conform to manufacturing conditions, without affecting the operability of this invention.

It is thus apparent that the film reel apparatus hereinabove described is adapted for use in conventional manner, except that no take-up reel is required. When a run is completed, the film is disposed within the reel precisely in the same condition as it was just prior to the unwinding operation, and is immediately ready for a further showing.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. In a film reel for use with a projection apparatus, a film chamber having a substantially spiral wall the convolutions of which form a single substantially spiral passage, said passage being open at one side of the reel, whereby a length of film may operatively enter and leave the passage endwise from said open side, a retractable film retainer in frictional engagement with the reel at the said open side thereof, whereby film operatively disposed within the chamber will be held therein by the retainer during the operative rotation of the reel, a pivotally mounted bracket movably supporting the retainer, the pivotal mounting for the bracket being on the side of the reel opposite the open face thereof, and a frame operatively associated with the projection apparatus, a shaft operably supported by the frame, the reel being mounted on the shaft, the pivotal mounting of the bracket being on said frame.

2. In a film reel for use with a projection apparatus, the combination according to claim 1, further provided with spring means urging said retainer into light pressing engagement with the reel.

3. In combination with a plurality of rollers for operatively guiding a moving film past the optical system of a motion picture projector, a film reel comprising a film chamber having a substantially spiral continuous wall extending substantially from the outer periphery of the reel inwardly to an inner terminal, the convolutions of the wall forming a single substantially spiral passage, said passage being open at one side of the reel, whereby a length of film may operatively enter and leave the passage endwise from said open side, said wall having an outer terminal portion, whereby the outer terminal end of a film operatively disposed within the chamber may be brought into anchoring engagement with said terminal portion, the axes of the reel and said rollers extending in substantially the same general directions, whereby said film may engage said spiral wall and said rollers in substantially untwisted condition.

4. In combination with a plurality of rollers for operatively guiding a moving film past the optical system of a motion picture projector, a film reel comprising a film chamber having a substantially spiral continuous wall extending substantially from the outer periphery of the reel inwardly to an inner terminal, the convolutions of the wall forming a single substantially spiral passage, said passage being open at one side of the reel, whereby a length of film may operatively enter and leave the passage endwise from said open side, said wall having an outer terminal portion, whereby the outer terminal end of a film operatively disposed within the chamber may be bent and brought into anchoring engagement with said terminal portion, said rollers being in a plane adjacent that of said reel and being positioned relative thereto for operatively receiving said length of film operatively entering and leaving the said spiral passage.

NORMAN J. RANDAZZO.

References Cited in the file of this patent

UNITED STATES PATENTS

| Number | Name | Date |
| --- | --- | --- |
| 1,213,489 | Binder | Jan. 23, 1917 |
| 1,897,283 | Templeton | Feb. 14, 1933 |
| 2,286,200 | Dollnig | June 16, 1942 |
| 2,351,396 | Broms | June 13, 1944 |
| 2,481,708 | Adams | Sept. 13, 1949 |

FOREIGN PATENTS

| Number | Country | Date |
| --- | --- | --- |
| 141,345 | Great Britain | Apr. 1, 1949 |
| 842,988 | France | Mar. 13, 1939 |